US007844594B1

(12) United States Patent
Holt et al.

(10) Patent No.: US 7,844,594 B1
(45) Date of Patent: Nov. 30, 2010

(54) INFORMATION SEARCH, RETRIEVAL AND DISTILLATION INTO KNOWLEDGE OBJECTS

(75) Inventors: Thomas D. Holt, Atherton, CA (US); Larry Stephen Burke, Brentwood Bay (CA)

(73) Assignee: Surfwax, Inc., Menlo Park, CA (US)

( * ) Notice: Subject to any disclaimer, the term of this patent is extended or adjusted under 35 U.S.C. 154(b) by 1858 days.

(21) Appl. No.: 09/649,436

(22) Filed: Aug. 25, 2000

Related U.S. Application Data

(63) Continuation-in-part of application No. 09/336,020, filed on Jun. 18, 1999, now abandoned.

(51) Int. Cl.
G06F 17/30 (2006.01)

(52) U.S. Cl. ..................... 707/709; 707/706
(58) Field of Classification Search .............. 707/3, 707/4, 5, 10, 104.1, 706, 708, 722; 715/513, 715/523
See application file for complete search history.

(56) References Cited

U.S. PATENT DOCUMENTS

| | | | |
|---|---|---|---|
| 5,222,234 A | 6/1993 | Wang et al. | |
| 5,625,809 A | 4/1997 | Dysart et al. | |
| 5,659,742 A | 8/1997 | Beattie et al. | |
| 5,751,286 A | 5/1998 | Barber et al. | |
| 5,813,014 A | 9/1998 | Gustman | |
| 5,913,215 A * | 6/1999 | Rubinstein et al. | 707/10 |
| 5,963,969 A | 10/1999 | Tidwell | |
| 5,987,454 A | 11/1999 | Hobbs | |
| 6,006,217 A * | 12/1999 | Lumsden | 707/2 |
| 6,012,069 A | 1/2000 | Shibazaki | |
| 6,014,680 A | 1/2000 | Sato et al. | |
| 6,026,388 A | 2/2000 | Liddy et al. | |
| 6,028,605 A | 2/2000 | Conrad et al. | |
| 6,081,805 A | 6/2000 | Guha | |

(Continued)

OTHER PUBLICATIONS

Shek, Eddie C. et al. Dynamic Online Collaborative Information Sharing in Sematic Multicast. HRL Laboratory, Malibu, CA. IEEE 1999.

(Continued)

*Primary Examiner*—Khanh B Pham
(74) *Attorney, Agent, or Firm*—Workman Nydegger

(57) ABSTRACT

The invention provides for various methods and apparatuses for searching bodies of knowledge, such as previously indexed source documents reachable over a network, search results from previous searches, and results from performing meta-searches. Search criteria is received from a client, and the bodies of knowledge are searched based on the search criteria, and search results provided responsive to said searching. Search results may be configured to have associated distillation triggers, where selecting a trigger causes its associated search result to be distilled in real-time. Distilled search results can be indexed into portions of the source document for focused entry, and can also be grouped and analytically presented on mid-menus to allow the user to review distilled data in summary form. Results may also have associated status symbols indicating by symbol a particular topic area to which a result is related, and by opacity or other indicator the apparent relevance of a result to the particular topic area. Search and viewing preferences may be determined according to psychometrics, user selection of a default user category, through a question/answer session, or based on monitoring user activity which incrementally defines a profile.

37 Claims, 10 Drawing Sheets

U.S. PATENT DOCUMENTS

| | | | |
|---|---|---|---|
| 6,134,553 | A | 10/2000 | Jacobson et al. |
| 6,144,958 | A | 11/2000 | Ortega et al. |
| 6,199,082 | B1 | 3/2001 | Ferrel et al. |
| 6,205,456 | B1 | 3/2001 | Nakao |
| 6,212,517 | B1 | 4/2001 | Sato et al. |
| 6,247,010 | B1 | 6/2001 | Doi et al. |
| 6,271,840 | B1 * | 8/2001 | Finseth et al. ............... 715/513 |
| 6,275,229 | B1 | 8/2001 | Weiner et al. |
| 6,275,820 | B1 | 8/2001 | Navin-Chandra et al. |
| 6,292,796 | B1 * | 9/2001 | Drucker et al. ................. 707/5 |
| 6,321,228 | B1 | 11/2001 | Crandall et al. |
| 6,327,590 | B1 | 12/2001 | Chidlovskii et al. |
| 6,334,126 | B1 | 12/2001 | Nagatomo et al. |
| 6,347,314 | B1 | 2/2002 | Chidlovskii |
| 6,356,920 | B1 | 3/2002 | Vandersluis |
| 6,359,633 | B1 * | 3/2002 | Balasubramaniam et al. .... 715/760 |
| 6,360,215 | B1 | 3/2002 | Judd et al. |
| 6,363,377 | B1 * | 3/2002 | Kravets et al. ................. 707/4 |
| 6,370,543 | B2 * | 4/2002 | Hoffert et al. ............ 707/104.1 |
| 6,385,602 | B1 * | 5/2002 | Tso et al. ....................... 707/3 |
| 6,397,209 | B1 | 5/2002 | Reed et al. |
| 6,397,212 | B1 * | 5/2002 | Biffar ............................ 707/5 |
| 6,397,218 | B1 | 5/2002 | Stern et al. |
| 6,405,192 | B1 * | 6/2002 | Brown et al. ................... 707/3 |
| 6,405,199 | B1 | 6/2002 | Carter et al. |
| 6,411,924 | B1 | 6/2002 | de Hita et al. |
| 6,421,675 | B1 | 7/2002 | Ryan et al. |
| 6,510,406 | B1 | 1/2003 | Marchisio |
| 6,510,434 | B1 | 1/2003 | Anderson et al. |
| 6,564,209 | B1 | 5/2003 | Dempski et al. |
| 6,594,654 | B1 | 7/2003 | Salam et al. |
| 6,601,061 | B1 | 7/2003 | Holt et al. |
| 6,691,108 | B2 | 2/2004 | Li |
| 6,738,765 | B1 | 5/2004 | Wakefield et al. |
| 6,886,130 | B1 | 4/2005 | Unger et al. |
| 7,010,681 | B1 | 3/2006 | Fletcher et al. |
| 7,177,948 | B1 | 2/2007 | Kraft et al. |
| 2002/0010709 | A1 | 1/2002 | Culbert et al. |

OTHER PUBLICATIONS

Bharat, Krishna et al. Improved Algorithms for Topic Distillation in a Hyperlinked Environment. SIGIR-98. ACM 1998.

Dean, Jeffery et al. Finding related pages in the World Wide Web. Elsevier Science B.V. Mar. 1, 1999.

Chakrabarti, Soumen et al. IBM Almaden Research Center. Focused Crawling: A New Approach to Topic-Specific Resource Discovery. 8th W3C Conference, Canada 1999.

Chakrabarti, Soumen et al. Mining the Link Structure of the World Wide Web. IBM Almaden Research Center. Feb. 1999.

Dobie, Mark et al. A Flexible Architecture for Content and Concept Based Multimedia Information Exploration. University of Southampton, Great Britain. Mar. 11, 1999.

Michard, Alain et al. The Aquarelle resource discovery system. vol. 30, Issue 13, Aug. 3, 1998, pp. 1185-1200. Computer Networks and ISDN Systems.

Dharap, Chanda et al. Typed structured documents for information retrieval. Department of Computer Science and Engineering, The Pennsylvania State University, Transarc Corp. Pub. 1996. Springer-Varlag.

Moore, R. et al. Jun. 1999—sdsc.edu, Collection-Based Long-Term Preservation.

Chakrabart et al. Topic Distillation and Spectral Filtering. Artificial Intelligence Review 13: 409-435, 1999. Pub. 2000.

Gutwin, Carl et al. Improving browsing in digital libraries with keyphrase indexes. Decision Support Systems. vol. 27, Nov. 1999, pp. 81-104.

U.S. Appl. No. 09/841,454, mailed Dec. 23, 2008, Final Rejection.

U.S. Appl. No. 09/841,454, mailed Feb. 13, 2008, Non-Final Rejection.

U.S. Appl. No. 09/841,454, mailed Jan. 26, 2007, Final Rejection.

U.S. Appl. No. 09/841,454, mailed Apr. 20, 2006, Non-Final Rejection.

U.S. Appl. No. 09/841,454, mailed Jul. 26, 2005, Non-Final Rejection.

U.S. Appl. No. 09/841,454, mailed Oct. 29, 2004, Non-Final Rejection.

U.S. Appl. No. 09/841,454, mailed Dec. 17, 2003, Final Rejection.

U.S. Appl. No. 09/841,454, mailed Mar. 13, 2003, Non-Final Rejection.

U.S. Appl. No. 09/587,672, mailed Mar. 7, 2003, Notice of Allowance.

U.S. Appl. No. 09/587,672, mailed Aug. 12, 2002, Non-Final Rejection.

* cited by examiner

INFORMATION SEARCH, RETRIEVAL AND DISTILLATION INTO KNOWLEDGE OBJECTS

RELATED APPLICATION

This application is a continuation in part of presently co-pending application Ser. No. 09/336,020, filed Jun. 18, 1999, entitled "Method and Apparatus for Composing A Search, for Searching a Corpus of Information or the Internet, for Displaying the Search Results in an Easily Viewable Manner, and for Crawling, Summarizing and Structuring the Corpus of Information"; and co-pending application Ser. No. 09/565,674 filed May 4, 2000, entitled "Information Search, Retrieval, and Distillation Into Knowledge Objects". These related applications are hereby incorporated herein by reference.

FIELD OF THE INVENTION

The invention generally relates to searching a network for text and non-text data, and providing for storing and forwarding search results. More particularly, the invention relates to applying linguistics and syntax analysis to augment searching.

BACKGROUND

Recently there has been a vast proliferation of networking connection options, for businesses and general users alike, for connecting to networks such as intranets and the Internet. Many such businesses and users position themselves as an end point, or point of interest (hereafter generally "web sites"), to whom others can connect and obtain information and other material. After several years of such end points becoming accessible of the networks, an enormous amount of information and other material is now available in an online electronic format.

A typical method for locating and reviewing such information is by way of a "web browser", such as Netscape Navigator, Internet Explorer, Opera, and other network application programs (hereafter generally "browsers"). Unfortunately, the very richness of available information has made finding anything specific an enormously complex and tedious task. The vast number of available web sites can be likened to a beach, where a particular search seeks to locate a particular few grains of sand.

Typical search methods employ either data categorization or keyword searching. In the former, a well known example is www-Yahoo-com, which provides broad categories and successively narrower topic areas. In the latter, there are typically two types. The first are traditional search engines such as NorthernLight-com, AltaVista-com, Excite-com, and the like, which "crawl" web sites and index the words found therein. The second are "meta" search engines, such as SurfWax-com, DogPile-com, and the like, which execute a search across multiple search engines, and provide options for collating results. It is estimated that only 10% of all web sites are indexed. (Please note that periods within uniform resource locators (URLs) have been replaced with hyphens to prevent hypertext links in an online copy of this application.)

Unfortunately, both categorization and keyword searching have significant drawbacks. Categorization requires intervention to place a site within a relevant category or categories. Such categorization is very subjective, and therefore may result in significant omissions or misleading results when a searcher drills down to detailed categories. And, categorization is resource intensive, and therefore few web sites are categorized. Thus, typically, only "main stream" sites are categorized.

Although keyword searching does not suffer the subjective effects of categorization, such searching requires a searcher to know the correct terms to use in order to perform an effective search. And, such searches typically result in a vast number of irrelevant search results ("hits") due to multiple uses for terms in diverse disciplines. For example, a search for "international policy" will return results concerning politics, college admission standards, international newspaper policies, foreign advocacy, etc., as each would use those terms someplace on their web page.

A further limitation to both techniques is that once the task of determining search results is accomplished, and results provided to a searcher's browser, there is no way to share those results with another party without re-executing the search. This results in a huge waste of computing resources. A related limitation is that the inherent lack of structure to web page data tends to result in web pages having large volumes of data within a given search result, where little of the web page data may actually be relevant to a particular query. In addition to making it difficult to find a relevant portion of a search result, large results can overwhelm the output capabilities of some devices (e.g., mobile devices) used for searching.

SUMMARY

Methods and apparatuses are disclosed for searching bodies of knowledge, such bodies including previously indexed source documents reachable over a network, search results from previous searches, and results from performing meta-searches. Search criteria is received from a client. The bodies of knowledge are searched based on the search criteria, and search results provided responsive to said searching. The search results may be configured with a distillation trigger, wherein selecting a trigger causes a related search result to be distilled in real-time. Distilled search results can be indexed into portions of the source document for focused entry, and can also be grouped and analytically presented on mid-menus to allow the user to review distilled data in summary form. Results may also have associated status symbols (or tokens) indicating by symbol a particular topic to which a result is related. For example, user perceptible characteristics of the symbol, such as shape or opacity, can be used to indicate a result's topic area, concept, document type, and apparent relevance to the search criteria.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

DETAILED DESCRIPTION

Figure 1:
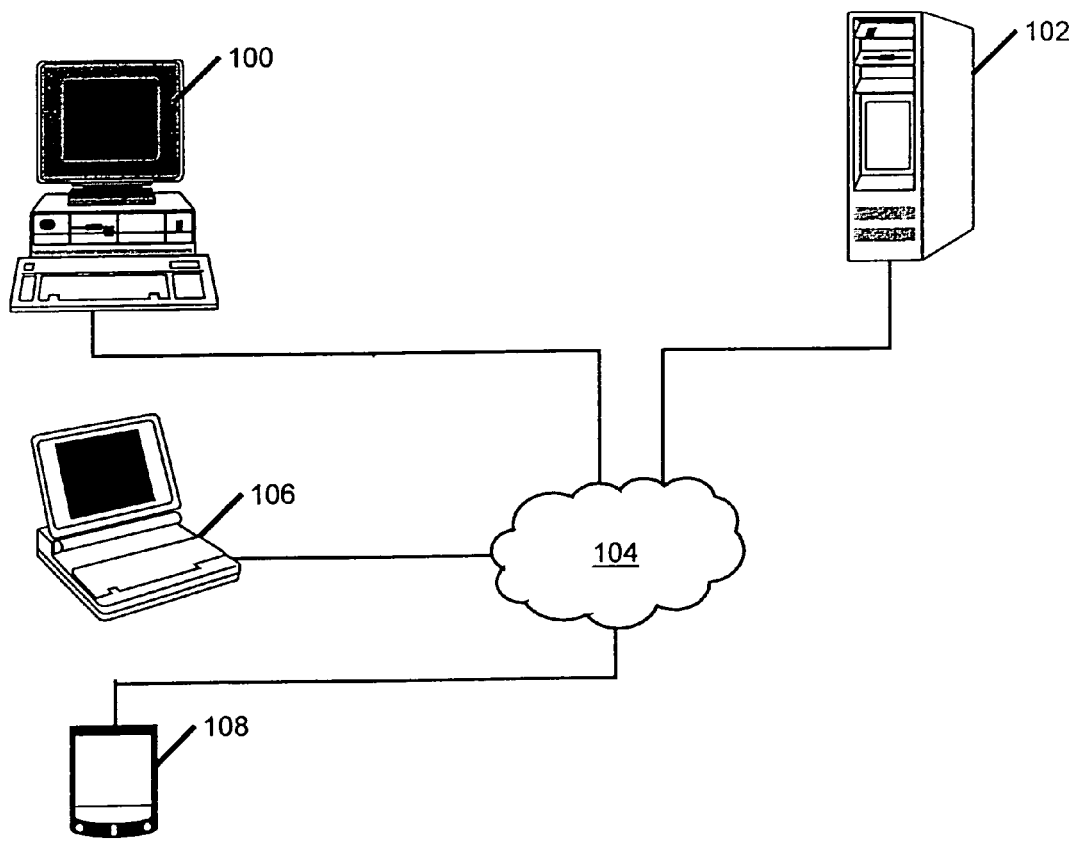
FIG. 1 illustrates a general hardware environment according to one embodiment of the invention.

Various exemplary embodiments of the invention are illustrated and discussed herein. In one embodiment, the invention is directed towards searching the Internet, which is a well-known collection of public and private data communication and multimedia networks (e.g., intranets, Wide Area Networks (WAN), Local Area Networks (LAN), wireless networks, cable television based networks, etc.), that operate using common protocols to form a world wide network of networks.

Throughout embodiments of this invention, various input/output devices and techniques are contemplated, including, but not limited to, wireless, mobile, voice-activated, voice recognition, and audio text-to-speech devices and techniques. Examples include, but are not limited to, personal computers (PCs), laptops, Personal Digital Assistants (PDAs), cellular telephones. A mix of input/output modalities is, therefore, contemplated. For example, a user may use a keypad on a PC, PDA, or cellular telephone, for instance, to enter input, and may receive search results via a browser; a user may use voice to communicate, and may receive results via a browser; and a user may use voice to communicate, and may receive a response via text-to-speech audio feedback. Communication mediums may be wired, including Public Switched Telephone Network (PSTN), Plain Old Telephone System (POTS), the Internet, Integrated System Digital Network (ISDN), and DSL (Digital Subscriber Line), cable modem, for example, or wireless, including microwave and satellite transmissions, or combinations thereof.

Searching can be focused on retrieving text-based documents, graphics, web pages, or other desired data types, such as structured storage (databases and the like), music, spreadsheets, and the like. For simplicity, it is assumed a search query is in English language, but, other languages and data formats (e.g., graphics) may also be searched. (For example, a graphics fragment could be dropped into a query box by way of Object Linking and Embedding (OLE) or through a Java Bean or ActiveX object.)

For the purposes of this description, the terms Uniform Resource Locator (URL), document, origination and source address are intended to be generally synonymous, as each term essentially references particular information at a particular network location. For simplicity, it is assumed addresses conform to the Transmission Control Protocol/Internet Protocol (TCP/IP) dot quad format (0.0.0.0). However, it should be appreciated that other address formats (such as wireless node identifiers) may be used without loss of generality.

It is assumed search commands and results are English based. However, such is not required, so long as individual language components can be identified, and appropriate analysis models provided for desired search types. The phrase "candidate source document" will be used to refer to an information source that may be returned to a user in response to a search request, depending on whether search criteria is satisfied.

FIG. 1 illustrates a general hardware environment according to one embodiment of the invention. Also described are general overviews of some features and advantages of illustrated embodiments. A client 100, operated by a user/person or expert system (artificial intelligence), communicates with a search server 102 through a network 104 such as the Internet. Other clients 106, 108 also communicate with the search server. Generally, a user of the client 100 may perform searches, with results provided according to preferences associated with the user (see FIG. 3). These results can also be made available to other users, such as operators of clients 106, 108.

Source documents (e.g., search results) can be returned to a user "as is," or in a "distilled" format, which is a reduced content version of a source document. For example, for a text document, distillation provides a condensed abstract of the document based on the language within the source document (see FIG. 4). Distillation is advantageous for client devices having limited display areas, such as Personal Digital Assistants (PDA), portable computers, Wireless Application Protocol (WAP) enabled devices, such as mobile phones, pagers, two-way radios, and "smartphones,", and other portable communication or computing devices having limited screens and/or computing resources (the phrase "mobile device" will be used to generally reference such PDAs, WAP enabled devices, portable communication or computing devices, etc.). Distillation is also generally helpful as it may be configured to provide a consistent interface displaying brief (per user preferences) overviews of source documents, thus allowing, for example, one to quickly determine the relevance of particular search results.

In one embodiment, a user of the client 100 and clients 106, 108 contact the search server 102 to submit search criteria and receive results thereto. It is expected that searches are keyword or natural language queries. It will be appreciated, however, that searching is not limited to text searches. For example, pattern analysis or image recognition may be applied to image data to locate images by their data content. Search results are obtained through comparisons of search criteria with known search domains (see FIG. 2) such as previously indexed web pages 202, meta-searches 204, by piggy-backing 206 onto private search engines, or searching against saved searched 208 of other users. Search results have an associated icon for creating a distillation of a result according to set user preferences (see FIG. 3).

In one embodiment, search results are packaged as structured objects, such as HTML or XML objects (hereafter "result objects"), with appropriate characteristic tags to identify the original searcher (user of the client 100), as well as the nature and contents of the search results. For example, if a user wanted to see focus words in a document, a focus words XML section would be defined with the appropriate words therein. It will be appreciated that other structured storage can represent result objects; XML is assumed due to its text-based data tagging and broad industry support. (The phrase "knowledge object" may refer to a single result object, as well as a collection of result objects.)

Because XML provides tagged structure to result objects, such objects may be linked within a structured lexicon, allowing building a heuristic search capability for subsequent searches, as well as user communities of interest based on saved searches. Result objects may also include public encryption keys or other validation requirements to restrict access to some or all of the tagged sections within a saved result object. Result objects are intended to be E-mailed or otherwise transferred to other users, and in one embodiment, the search servers track result object sharing between users so that users can be informed when there is a change in shared data. In one embodiment, an editorial module (e.g., executed by a search server administrator) allows one to edit and/or contribute supplemental content to result objects.

In one embodiment, an application programming interface (API) is provided for interfacing with a search server 102. The API provides an interface to the search server, through which third party developers (or users) can provide search services that are integrated with the search server. In addition, the API will enable search server administrators to extend the capabilities or customize a search server without modification to the underlying searching engine employed by the search server.

In one embodiment, the API is implemented by way of executable objects, such as ActiveX controls or JavaBeans (which are Java-based platform-independent controls developed by Sun Microsystems, Inc. of Palo Alto, Calif.). It will be appreciated that other object formats can be used to implement the API. Executable objects are intended to be stored within a search server 102 (executing as server side objects); however, in an alternate embodiment, executable objects can be stored within result objects for downloading to a client 100 as needed. The executable objects are used by a client 100 as needed based on the preferences (see FIG. 3) set by a user of the client, e.g., the user indicates the executable objects should be used when distilling the search results (see FIG. 5).

The executable object, whether stored in a search server or within a result object, may be configured to be executed when search results are received by a client. Associated with the executable objects are extended processing statements that incorporate regular expressions, user preferences, or other data extraction techniques. Extended processing statements can be applied to a source document or a result object, and can be applied by the search server 102 to other result objects associated thereto.

Figure 2:
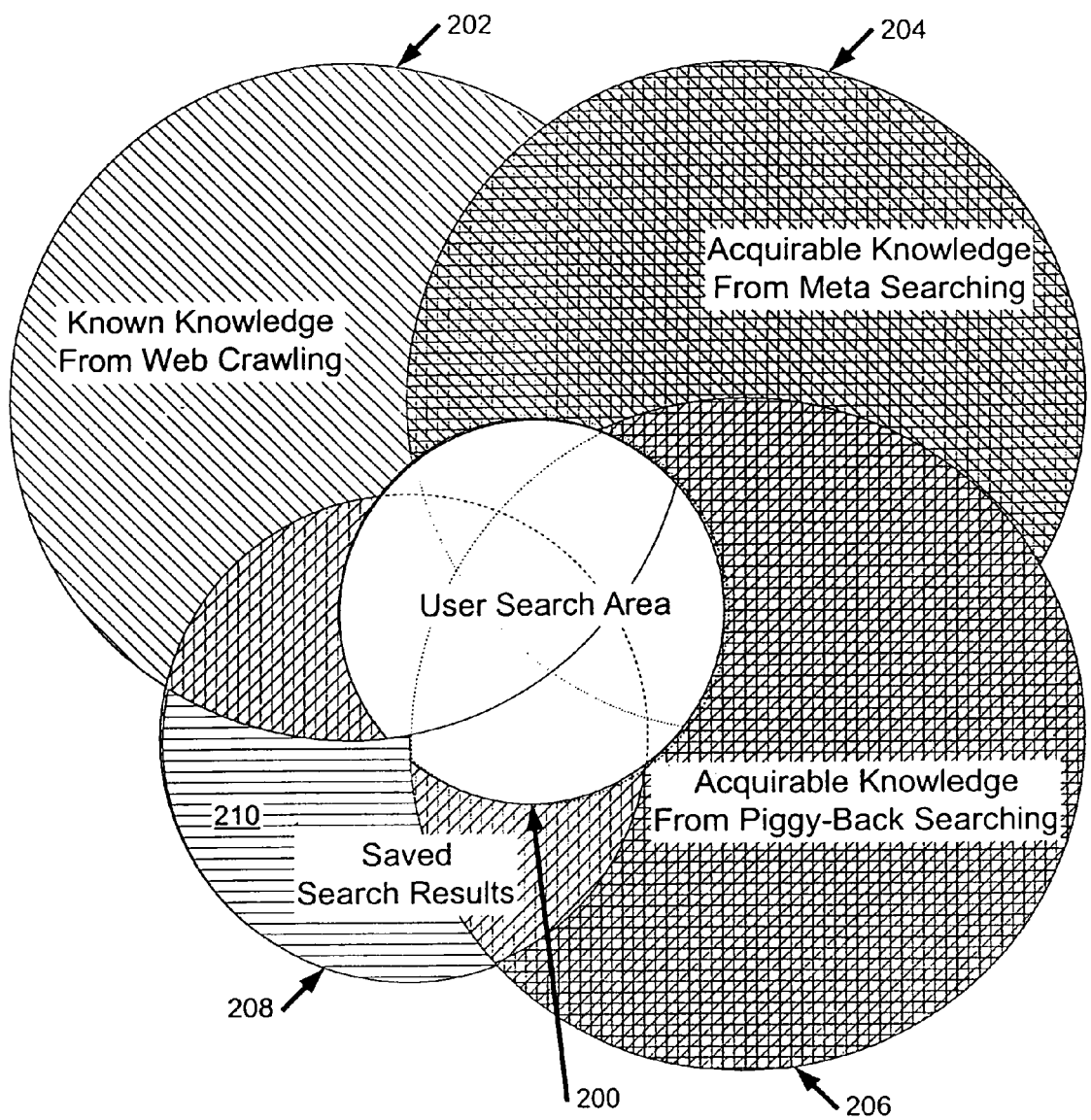
FIG. 2 illustrates exemplary search domains utilized by the FIG. 1 embodiment of the invention.

FIG. 2 illustrates exemplary search domains utilized by the FIG. 1 embodiment of the invention (other search domains are contemplated). The central circle 200 pictorially corresponds to the "universe" of a user's search query, e.g., the theoretical extent of a search as determined by the particular search criteria and search options (FIG. 3) used by a user. The upper left circle 202 corresponds to data previously known to a search server by way of prior data acquisition, web crawling, etc. The intersection of the user's query circle 200 and the known knowledge sphere 202 corresponds to search results from within this known knowledge that satisfies the user's search query.

The upper right circle 204 corresponds to acquirable knowledge from performing meta-searches, e.g., searches by way of other search engines. As with the known knowledge, intersection of the acquirable knowledge circle 204 circle with the query circle 200 corresponds to relevant search results from this particular search domain. Similarly, the lower right circle 206 corresponds to acquirable knowledge from piggy-backing onto private search engines provided by individual web sites, such as those search engines provided by universities, government web sites, or the like. In the piggyback configuration 206, the invention may, for example, visit a private or local search page for the Massachusetts Institute of Technology, execute a search thereon, and provide filtered search results to the user of the client 100.

The lower left circle 208 corresponds to search result objects stored by the search server 102 and made publicly available by the users generating the results. These publicly accessible results can be included when performing the user's search, and contribute to the current user's search. One advantage of saving previous search result objects for later sharing is that, as illustrated, there can be a portion 210 of saved search data that is no longer available to other search techniques. Knowledge gaps are common as a result of rapid changes in online data content. In one embodiment, "keys" are assigned to user search result objects, where the keys operate as an identifier of the type of data stored within the result object. (Keys can be thought of as a form of a Dewey Decimal system for result objects.)

Figure 3:
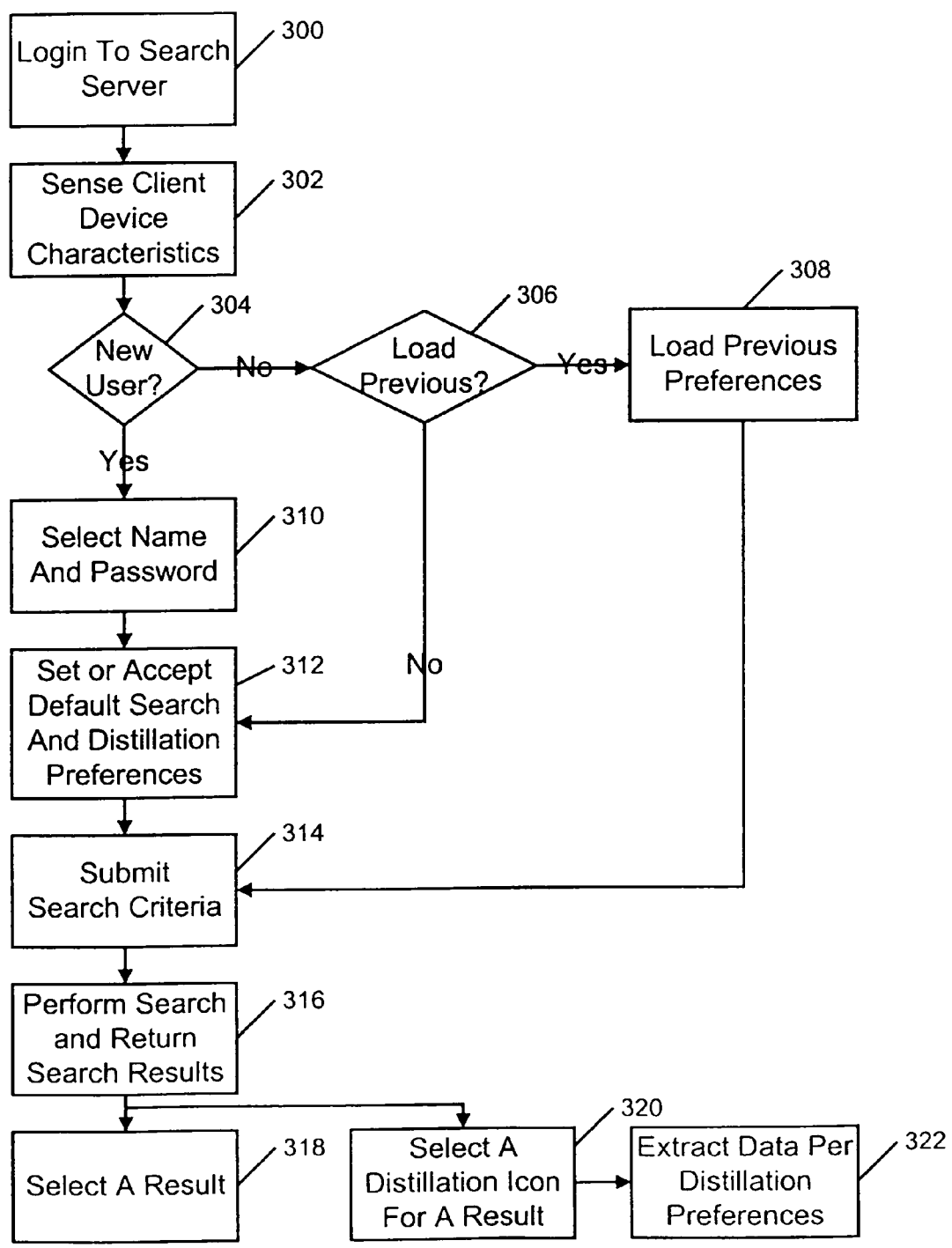
FIG. 3 is a flowchart illustrating typical operations undertaken by a user to perform a search with a search server.

FIG. 3 is a flowchart illustrating typical operations undertaken by a user of the client 100 to perform a search with a search server 102. A first operation is for a user to login 300 to a search server. Assume that, by way of "cookie" files, or other techniques, such as login forms, a user authenticates with a search server. Authentication allows user preferences to be saved and restored across different search sessions. Preferences include how search results should be parsed for distillation into a result object, including setting value ranges for date, money values, viewing formats, as well as other output formats (e.g., audio), output data formats (e.g., HTML, WML, XML, plain text, etc.), and other data priorities for the user.

After logging in 300 the user's connection device is sensed 302 for communications characteristics, such as display characteristics or audio characteristics, and output formats are adjusted accordingly.

After logging in 300 the user's connection device is sensed 302 for display characteristics, and viewing formats are adjusted accordingly. Unless overridden or supplemented by a user preference, the search server automatically tailors output according to a user's connecting device characteristics, and/or other user preferences or characteristics such as psychometrics associated with the user, which may require overriding or supplementing view preferences discussed below. Thus, a user using a computer having a large browser window can be presented with results differently than will a mobile device.

Mobile devices may access the Internet with a restricted browsing environment, such as a "microbrowser" tailored for small data files, limited memory, and low-bandwidth requirements typical of most wireless networks. Consequently, rich source document content is reduced (e.g., graphics are converted to low-resolution) or discarded. And, data for the mobile device is converted into a format suitable for receipt by the mobile device. For example, currently, WAP enabled devices expect data to be encoded in WML (or equivalent), which is an XML variant specifically devised for small screens and one-hand navigation without a keyboard. WML output may include WMLScript, a JavaScript-like language tailored to a WAP enabled device's restrictive computing environment. Thus, as needed, data, whether previously encoded in HTML, XML, or other data format, is converted into WML (or other needed format) for receipt by a mobile device.

After logging in, a test 304 is then performed to determine whether the connecting user is a new user. If not new, a second test 306 is performed to determine whether to load previously used search results. If so, then search preferences, data types (e.g., dates, names, historical events, geography, job skills, etc.), and viewing preferences discussed below are loaded 308 for the user. In one embodiment, the user is prompted with a list indicating previously saved search sessions that may be retrieved. If the user does not desire loading previous searches, then processing continues with setting search preferences.

If the user is a new user, the search server creates a new record for the user with name, password preference option fields unset, and the user selects 310 a name and password. A user's profile is stored in a database associated with the search server. In one embodiment, different search servers maintain their own user databases, but cross-check with each other to verify if an apparently new user is known to another search server; if so, then the user's preferences can either be used remotely or copied locally and synchronized with the other search server. In one embodiment, multiple search servers share common (perhaps virtual) permanent storage.

The user may now choose to set 312 a variety of options to control searching, distillation (abstracting) and viewing of search results. Options are separated herein into three general categories, search preferences affecting the search process, data type preference controlling distillation of search results into result objects, and view preferences controlling display of data captured within a result object. In one embodiment, search options are internally represented by a search server as a series of constraint rules that are solved to determine whether a candidate source document meets all user options.

Figure 3B:
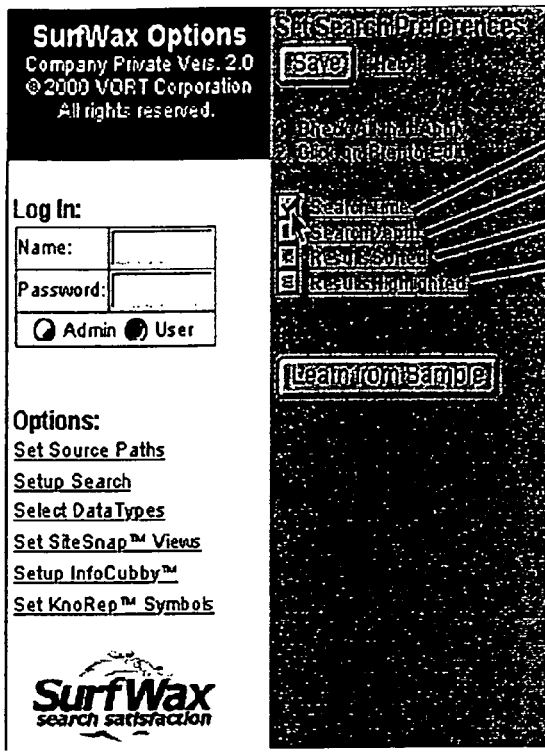
FIGS. 3B-D illustrate user preferences dialogs used during the FIG. 3 exemplary search.

FIG. 3B illustrates a Set Search Preferences dialog box 330. A first option is set Search Time 332. This option indicates how long the search server should wait for results from search resources 202-208 (FIG. 2). Another option is a Search Depth 334 option. This option controls how many results to return from a source, or how "deep" to search within a site if a depth-first type of traversal is being performed.

Another option is a Results Sorted 336 option. This option controls whether to sort results by "apparent title" or document source. The phrase "apparent title" is used as some sources, such as web pages, embed control tags (e.g., HTML statements) indicating a page's title. Other data sources, such as plain text files, word processing files, spreadsheets, databases, etc., do not have associated tags indicating a title. In one embodiment, for text files, the first few words in the file are used as a title. In other file formats, a viewer filter is applied in effort to determine a title. For example, in the word processing file example, the file may contain an embedded document properties object indicating a title, or the first few words of the file can be used as the title. If no possible title can be determined, the source document's network location (e.g., its URL in an Internet context) can be used as a title.

Another option is a Results Highlighted 338 option. This option determines whether to highlight the context within search results. In one embodiment, highlighting means to bold face or otherwise accentuate (for example, with auditory feedback) search terms within a source document.

Figure 3C:
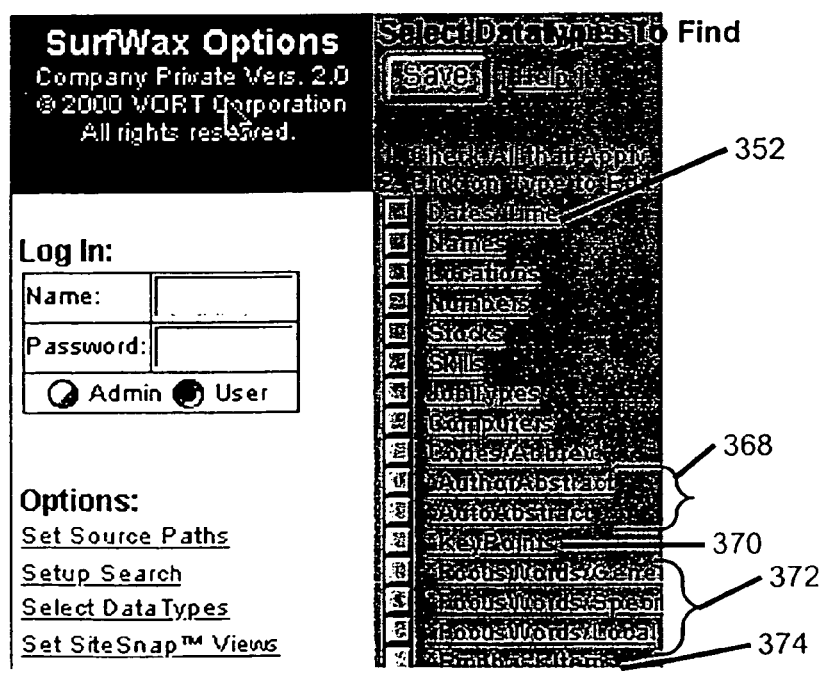
Figure 6:
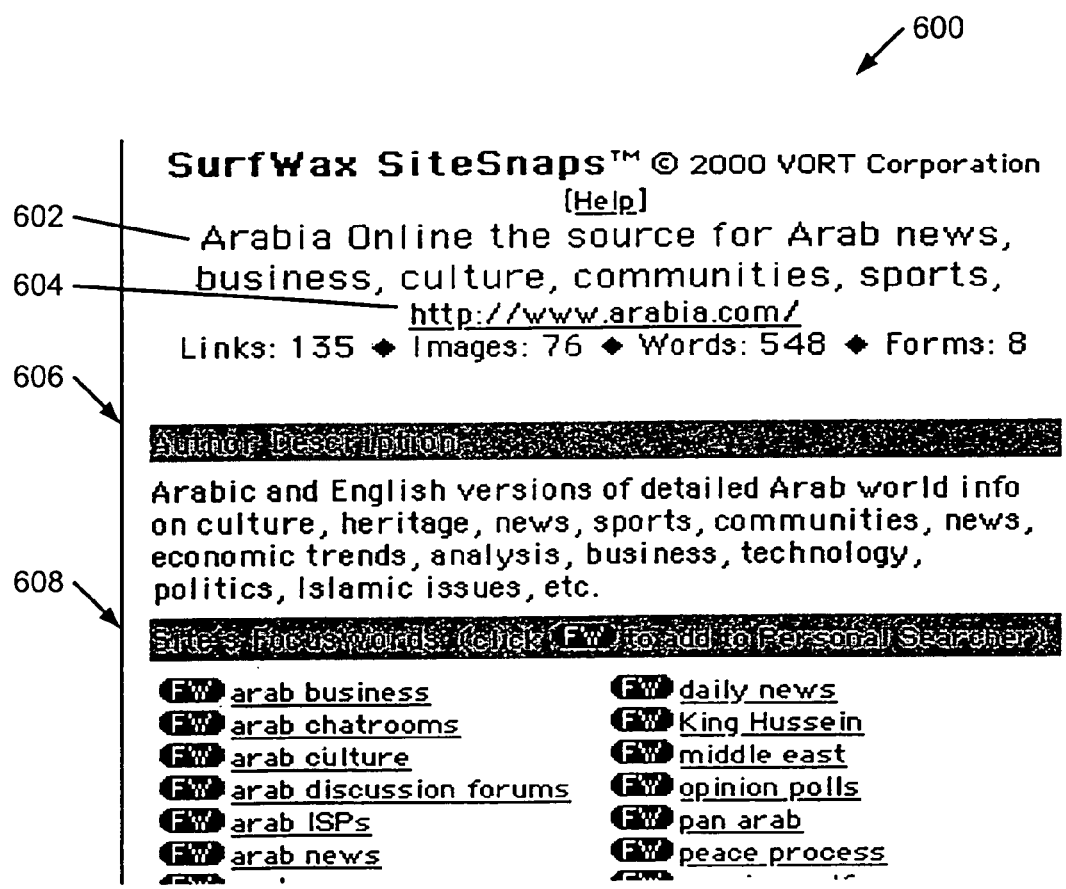
FIG. 6 illustrates an exemplary output from the distillation process for a source document.

FIG. 3C illustrates a Select Data Types To Find dialog box 350. Generally, after performing a search, a user has the option of clicking on a particular search result, causing that result to be presented to the user (e.g., in a new browser window), or the user may request real-time distillation by selecting a distillation trigger (FIG. 4 item 402) of the source document into a result object (FIG. 6). The FIG. 3C dialog provides an exemplary list of data types, which when selected, constrain distillation of a source document. Only source document content satisfying selected data type constraints will occur in a result object.

It will be appreciated that these requirements can also be used to determining the user's initial list of search results. That is, after entering a search, a candidate list of search results is determined in accord with traditional searching methods. Without displaying the search results to the user, the search server instead prepares distilled result objects for each candidate result, and applies the search criteria to the distilled data, and removes source documents not containing the search criteria in the distilled data. Thus, if the user seeks a certain type of document having identifiable language constructions and lexical structure, such as legal documents, the search server can pare the initial search results to remove documents failing to have appropriate structure.

In one embodiment, the distilled object is compartmentalized. For example, if constructed as an XML object, the result object is defined with tags (or equivalent structural definitions for other data formats) are defined containing matching source document text for each data type option. For example, a Dates/Times 352 constraint can be selected, causing the user to be presented with options for setting valid date and time values, ranges, and formats (e.g., month/day/year, day/month/year, month/year, etc.) for data in the distilled result object. After distilling a document source, the result object then contains an XML tag pairing, such as <DATES></DATES> containing matching source document data meeting the data type criteria.

Other options include Abstracts options 368 which allow setting requirements for sentence position, density, word frequency, sub-phrase parsing, etc. characteristics for data to be included in the distilled data. Source document data meeting these requirements are included in the result object within an appropriately labeled tag pairing. Abstracts can also be defined with respect to one or more of the data types discussed herein, such as key points 370, focus words 372, author's summary, or other data of interest to the user.

The Key Points 370 option causes a candidate source document to be analyzed to identify key sentences. Key sentences can be determined, for example, by word matching, sub-phrase parsing, special part of speech parsing, use of action words, word frequency counting, and based on other lexical analysis techniques known in the art. Key sentences may comprise entire sentences, portions thereof, or combinations with one or more other sentences. For example, a key sentence may be a phrase, or a slug of text having no structured connotation. It will be appreciated that other known techniques for identifying key sentences may be used.

The Focus Words 372 option causes a candidate source document to be analyzed to identify focus words. As discussed in patent application Ser. No. 09/336,020 (which is incorporated herein by reference), focus words are related terms and phrases for a particular word or phrase, where the related terms are concepts or terms that are narrower, roughly equivalent, or broader in scope than words in a source document. Focus words can be determined by testing for part of speech, capitalization, word frequency checking, and presence in various word dictionaries such as Names, personal, corporate, geographic, events, holidays, and the like. Focus words determination can also be applied to the user's search query to aid in formulating a query of proper scope.

Another option is an Emphasis Items 374 option. When a source document is analyzed, all structural elements, such as tag pairings or other devices used to denote document structure, are identified and their contents stored and associated thereto. Thus, if a source document contains <TITLE>My Title</TITLE>, the text "My Title" is stored and associated as being part of the TITLE tags. Selection of this option causes a supplemental user interface (not shown) to be presented, where the user may selectively elect to view (according to user view preferences) particular structural elements (such as the TITLE tag data) and their associated data.

Figure 3D:
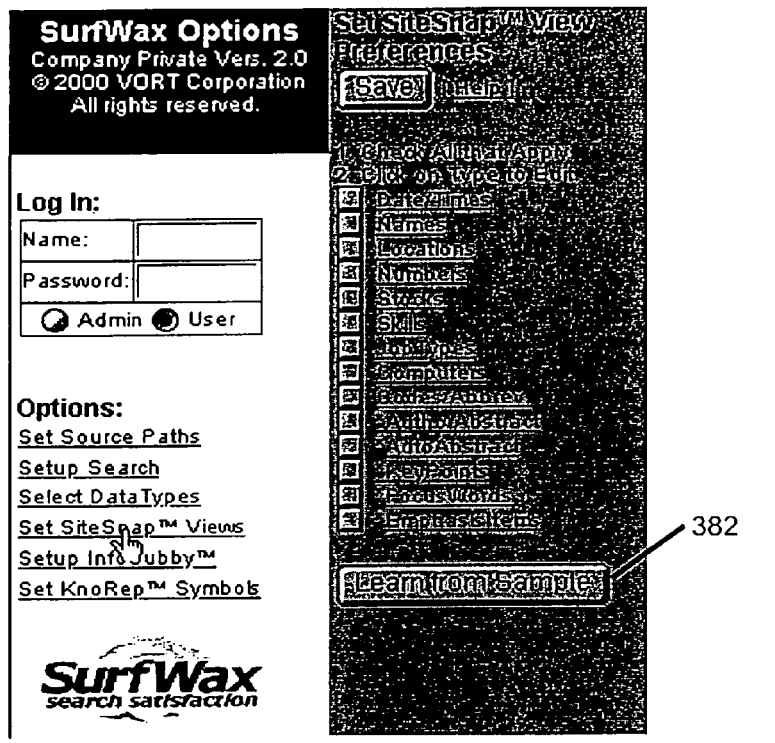

FIG. 3D illustrates a set View Preferences dialog box 380. The view options control how distilled contents within a result object are displayed to a user. Note that if the user was sensed 302 to be connecting to the search server by a restrictive device such as a mobile device, display options may be overridden or supplemented to conform to viewing capabilities of the user's particular connecting device.

View options generally correspond to the distillation data types discussed above, and operate under similar principles. View options allow a user to sort order of appearance, determine what to emphasize (e.g., Emphasis Items 374 option), set minimum and maximum viewable values, for example, set a limit to the total number of dates shown, show only the N most often occurring dates, etc., for data within the result object. Note that one need not set a data type option in order to use a corresponding view option. For example, once can omit date range restrictions on distillation, yet require them to control display.

In one embodiment, a user may select a "Learn from Sample" button 382 to visually see the effect of selected data types and viewing options. Learn from sample allows a search server to provide a visual tutorial as to the effect of options available to the user, and allow the user to compose complex searches based on perceived results.

In a further embodiment, as discussed above with respect to FIG. 1, executable objects, such JavaBeans or ActiveX controls, may be used to refine or control distillation of search results. If this embodiment, a user may set a viewing preference (not illustrated) indicating such executable objects are to be used in the distillation process.

Continuing again with FIG. 3, once the user has set or accepted default values for search preferences 312, data types, and setting viewing preferences, the user then submits 314 search criteria to be searched for within available search domains (e.g., FIG. 2). In one embodiment, search criteria can be forcibly included or excluded through use of +/−(or equivalent), causing search results to correspondingly include or not include criteria so designated. In one embodiment, the search server applies date/time sensitive analysis to adjust the weighting of results priority (unless results are ordered/alphabetized). For example, a search term of "hearts" in February would rank higher valentine's day results.

In another embodiment, a user may enter a natural language query, or non-speech query, such as a search-by-example query for graphics image data. That is, exemplar graphics data can be dragged and dropped into a search box, and the search server locates image files, and performs image analysis (e.g., Motion Picture Experts Group (MPEG) imaging techniques) to identify results similar to the exemplar.

In one embodiment, a simplified preference setting interface (not shown) is presented to a user, where the simplified interface allows the user to select from several default search and distillation categories, where selection causes various of the above-described options to be set automatically for the user. For example, one category might be "Educator", another "Pharmacist", or another category might be "Human Resources." Alternatively, psychometric measures, for example, an adjective check list, may be used to set these default options. In each case, the four main types of user preferences would be set to default values deemed appropriate for each search category. In this embodiment, the user may select and advanced options page to display and adjust the default values.

After entering the search criteria, the search server performs 316 a typical search through known domains (FIG. 2), resulting in a list of source documents satisfying designated search criteria. The user can then select 318 a listed source document, causing it by default to be opened in a separate browser window. Use of the separate window allows maintaining the contents of the search results window. Or, the user selects 320 a distillation icon 402 (FIG. 4), which by default is displayed adjacent a source document link 404 (FIG. 4), where selection causes distillation of the associated search result link 404 according to the user's set preferences (FIG. 3).

Assuming election to distill a source document, the search server then extracts 322 (see FIG. 5) the clicked on source document according to the data types, rules, ranges, and view formats designated in the user's options 330, 350, 380.

Figure 4:
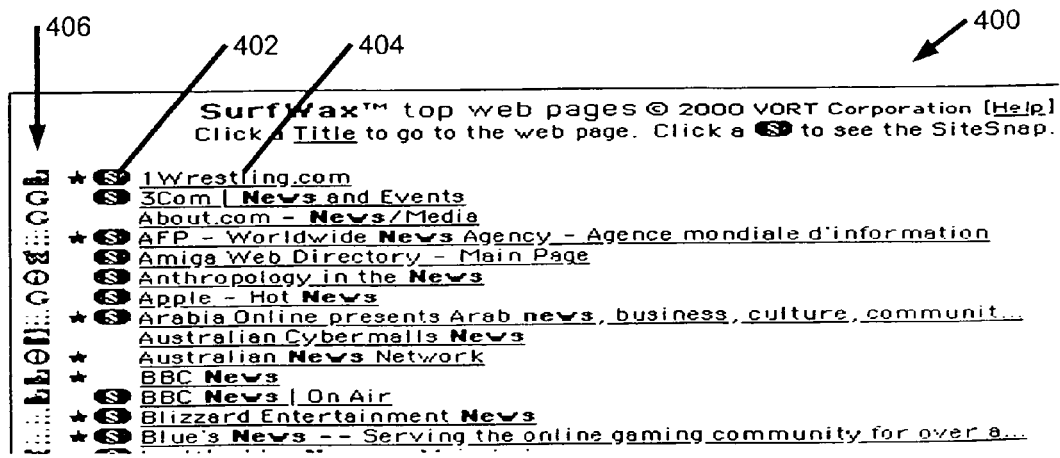
FIG. 4 illustrates a search results window containing an exemplary list of search results from the FIG. 3 exemplary search.

FIG. 4 illustrates a search results window 400 containing an exemplary list of search results. The results are typically a list of URLs, document titles, or brief descriptions (abstracts) of source documents. As discussed above, the search results list includes a distillation trigger 402 (FIG. 4) such as an icon or other triggering region that is presented here adjacent to a search result 404. (Distillation is discussed in FIG. 5.)

Also illustrated are "knowledge representation" symbols (or tokens) 406. In one embodiment, these symbols have associated user perceptible characteristics, such as shape or opacity, which can be used to indicate a result's topic area, concept, document type, and apparent relevance to the search criteria (hereafter generally "topic area").

For example, one symbol may represent document age, where a hollow outline indicates an old source document, while a solid symbol means a new or current source document. Or, a symbol may represent the number of words in a source document, or number of pages, where a solid portion of a symbol indicates relative length of the source document. Or, a symbol may be associated verb activity within a source document, so that if a document is lexically analyzed (such as through analysis of verb structures) and determined to be "active", then a solid portion of the symbol is used to indicate such activity (perhaps as a ratio relative to the source document's size).

In one embodiment, representation symbols are associated with the searcher's search terms, thus allowing a searcher to evaluate apparent relevance of a search result to a particular topic area based on user perceptible characteristics (e.g., symbol shape, opacity, sound, etc.) of the representation symbols 406. In one embodiment, a user may also create, edit, or assign representation symbols to results, thus categorizing results as belonging to certain result type categories, e.g., identifying source documents concerning religion, politics, money, legal, medical, etc.

Figure 5:
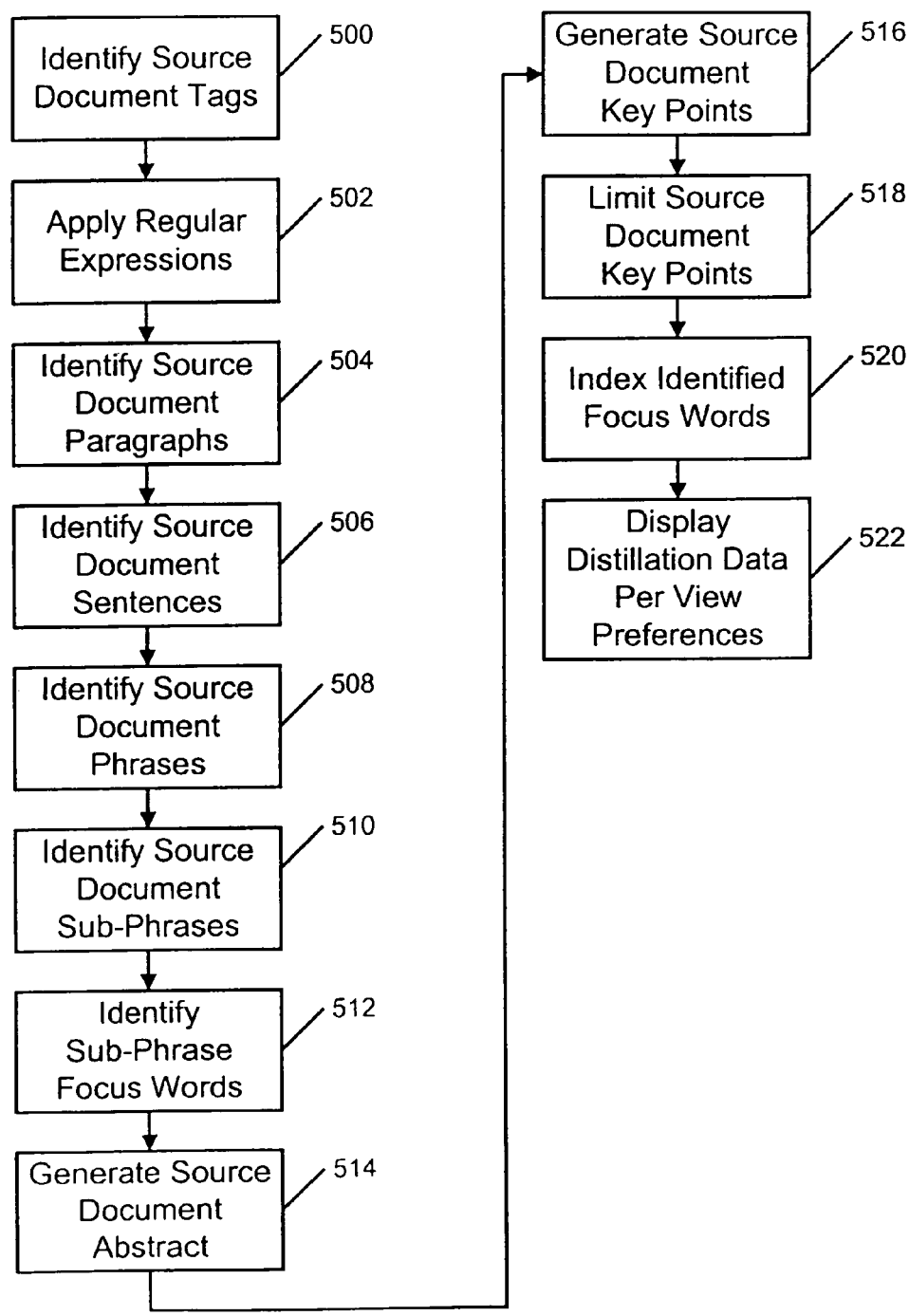
FIG. 5 illustrates the distillation extraction process according to one embodiment of the invention.

FIG. 5 illustrates the distillation extraction process according to one embodiment of the invention. Each of a user's data type and rules/ranges options are used to both identify which data to consider for extraction, and the scope (amount) of the extracted information. Note that since the illustrated sequence of operations each operate on the original source document contents, the illustrated order of operation is arbitrary, and in fact, can be performed in parallel to increase efficiency.

A first operation is to identify 500 all source tags (e.g., HTML, XML, etc.) within a candidate source document, and save the content (values) of the tags into variables determined according to the user's options (FIG. 3). For example, if the user sets an option to receive title information, then if a title is identified within the source document, then the identified title is placed within appropriate (e.g., <TITLE></TITLE> XML tags (recall that the result object is, by default, encoded as an XML object).

Regular expression pattern matching rules (e.g., akin to the Unix "grep" command) are applied 502 to isolate data elements such as dates, part numbers, etc. of interest to the user. After isolating these data elements, for text based source documents, the source document is reduced into five "data levels" corresponding to (1) identifying document paragraphs 504, (2) identifying paragraph sentences 506, (3) identifying sentence phrases 508, (4) identifying phrase subphrases 510, and (5) identifying sub-phrase focus words 512.

Paragraphs are identified 504 through identification of hard return characters (e.g., ASCII characters 10, 13, word processing end of line characters, etc.), manual line breaks, blank lines between blocks of text, and the like. If the source document structured document such as HTML, DHTML, JavaScript, XML, WML, etc., the source document is also processed for indications of paragraph breaks based on punctuation related tags. For example, in an HTML type of source document, the paragraph tags (<P>) or use of a double break tag sequence (<BR><BR>) are treated as defining paragraphs.

Sentences can be identified 506 by isolating the use of punctuation (e.g., periods, question mark, exclamation point, etc.) to locate ends of sentences. In addition, punctuation usage is compared to exemplars so as to recognize certain types of sentence constructions, such as the salutation "Dr". Identified sentences (or "slugs" of connected text, since not all source documents, such as HTML type sources, follow conventional grammatical structures) can be identified by isolating use of punctuation (e.g., periods, question mark, exclamation point, etc.) to isolate ends of sentences. As with paragraph detection, use punctuation is compared with exemplars. If the source document structured document such as HTML, etc., the source document is processed for a combination of punctuation in combination with sentence ending structure such as single or double line spacing, or punctuation tags such as a break tag (<BR>).

Phrases can be identified 508 based on punctuation patterns. In one embodiment, phrases are identified as comma delimited portions of identified sentences. Alternatively, lexical analysis tools can be applied to parse the grammatical structure of the source document so as to identify phrases therein.

Sub-phrase focus words can be identified 512 by parsing phrases into sub-phrases 510 by comparing identified phrases to a lookup table containing conjugation slugs. (See also parent application Ser. No. 09/336,020 for focus word extraction techniques.) For example, a partial lookup table might contain a list the following English conjugation phrases:

| Entry | Conjugation Slug |
|-------|------------------|
| 1 | to the |
| 2 | to a |
| 3 | to an |
| 4 | of the |
| 5 | of a |
| 6 | of an |
| 7 | by the |

In one embodiment, the lookup take is implemented as a programming array containing strings, where each array entry contains a conjugation slug.

If the search server encounters a conjugation slug, the portion of the phrase preceding the conjugation slug is labeled, and the sub-phrase and identified conjugation slug text is removed from the source document text being inspected, and processing continues with the remaining text to identify other conjugation slugs and associated sub-phrases. In one embodiment, labeling means to store the $n^{th}$ identified sub-phrase in an array, where new entries are entered for each such phrase. It will be appreciated that other data structures may be used to store identified sub-phrases.

After identifying the sub-phrases, the search server submits them to a core extraction process that uses part-of-speech dictionaries, known grammatical structures, dictionaries of controlled-vocabularies specific to a domain (e.g., law, medicine, proper names, historical events, etc.), capitalization-weighting rules, phrase-construction rules, and de-duplication algorithms to identify focus words from the identified sub-phrases. In such fashion, words not appearing to have significance, e.g., not being found in dictionaries or appearing lexically significant through capitalization or other analysis rules, are ignored. Remaining words are deemed focus words for a source document that convey a distilled essence of the source document.

The source document is also processed to generate 514 an abstract based on identifying paragraphs and key slugs of text based on punctuation patterns, and using position weighting, length limiting, and frequency weighting to identify key sentences in the source document from which to compose an overview abstract of the source document. In addition, the length of the abstract is adjusted according to the sensed 302 display characteristics of the user's connection device. For example, if it is known that the user is using a mobile device, then a small abstract will be generated.

The source document is also processed to generate 516 key points. In one embodiment, the search server inspects each sentence and phrase for patterns of use between verbs within the sentences and phrases. To do so, the server first uses known part-of-speech parsers (e.g., the "Brill POS Tagger" by the Department of Computer and Information Science, University of Pennsylvania, and the Spoken Language Systems Group, Laboratory for Computer Science, MIT) to isolate verbs within a sentence or phrase. Generally, some source document words are recognized immediately as nouns, verbs, etc., while other words require inspection of prefixes, suffixes, infixes, adjacent word occurrence and other syntactic analysis to identify appropriate parts of speech.

Identified verbs are compared to a hierarchy of "verb sequences" which are groupings of verbs arranged in "process order"; for example: see→pickup→sniff→taste→chew→swallow→smile. The verb sequences are ranked by "level of action" where "state of being" verbs such as "are" and "is" may be ranked near or at the top of the hierarchy, followed by verbs sequences of "action towards", then verbs sequences of "association" then verb sequences of "communication from," etc. The hierarchy of verbs, the sort order, and the arrangement of the verb sequences can vary based on context (associated nouns). The verb sequences may be implemented as sorted arrays, lookup tables, or Java vectors, or other structured format allowing for indicating sequences. (For further information regarding verb sequences, see *Action Words Directory*, published by VORT Corporation (1979), which is hereby incorporated herein by reference.)

Thus, for example, the server may parse the user's search criteria, or a history of the user's or associated users' search criteria (assume a words based search) and compare the search criteria words to a controlled-vocabulary. In one embodiment, the controlled-vocabulary are the identified focus words (discussed above), and they are used to associate nouns to the search criteria. In an alternate embodiment, an array or hierarchy of context-related (subject-based) nouns are compared and associated.

If associated nouns convey no action, e.g., they are not associated with one or more verb sequences, then only "state of being" verbs are used in the key point filtering (extraction) process. But, if the nouns convey action, e.g., they are associated with one or more verb sequences, then the verbs in the controlled vocabulary associated with those nouns are used in the key point filtering process. The key point filtering process involves finding which subsets of text (e.g., sentences or phrases) of the distilled result object contain which of these verbs (or verb sequences and patterns) to select and rank those subsets of text as key points. Further, a user may set preferences (not shown) for assigning a priority to verb sequences (action levels); the priority may then be used as part of a calculation to determine which verb and verb sequences are to be applied in the key point filtering process.

Key points can also be generated by matching words from the user's search criteria to the same words in the source document. As a result, matched-in-context key points are created. For example, if the user's search criteria is "venture capital", matched-in-context key points from a source document comprise:

"Maurice Young Entrepreneurship and Venture Capital Research Centre at the Faculty of Commerce, University of British Columbia."

" . . . Venture Capital Consultants. Visit our roster of venture capital consultants, including business plan, legal, and marketing . . . "

"Venture Capital Information Sources learn from our listing of venture capital information sources, including libraries . . . "

In one embodiment, a user can set as a user preference how many key points they want in their distilled source document. When there is a limit, the search server ranks each sentence or phrase against the verb hierarchy, and cuts off 518 the number of key points that qualify based on the selected user preference. The search server can also uses this "number of key points" metric to determine the average number of key sentences should be included in an abstract.

After the extraction process, the search server has all components, e.g., tag values, regular expression matches, abstract, key points, focus words, and other data types of interest needed to construct a distilled version (e.g., result object) for a source document. In one embodiment, the user is provided with viewing preferences to set a numerical and/or relative position for the contents of the distilled source document. For example, the user can assign a first, second, third position for desired data, and/or the user may set relative preferences such that the abstract is above extracted dates (from regular expression matching) but below key points. Fixed and relative position preferences define a constraint system that can be dynamically solved and cause data to be displayed 522 to a user's connecting device.

In one embodiment, identified focus words are also indexed 520 within a database of focus words maintained by the search server for storing identified focus words arising from previous searches by the current and other (different) searchers. In such fashion, processing required to identify focus for one user's search may be re-used in other searches by making the results available to other searchers. In addition, such search retention makes available content that may otherwise become unavailable due to the original source document being taken offline from the network.

FIG. 6 illustrates an exemplary output 600 from the distillation process for a source document.

As discussed above, the illustrated information is stored within a result object that has been created in real-time for a particular document source. It is assumed that such real-time distillation is responsive to clicking on an icon or other trigger associated with search results. Since distillation is in real-time, and can be based on results obtained from a conventional search, rather than the searching techniques disclosed herein, the distillation process can therefore be added to any existing search engine or other application program having access to discrete bodies of source data.

Based on the user's device characteristics, e.g., regular browser window on a computing device, restricted browser environment within a mobile device, the server presents a result object's contents (the distilled data) in an appropriate data format and language (e.g., HTML, WML, XML) to match both the parameters of the user's device and the user's selected viewing options.

Illustrated for example, are a title 602 that was determined for a selected result, the URL 604 for the source documents being summarized, and various result regions 606, 608 containing identified data within the source document pursuant to selected search and view preferences.

In particular, the illustrated results provide focus words 608 which may be selected to adjust the search.

Figure 5B:
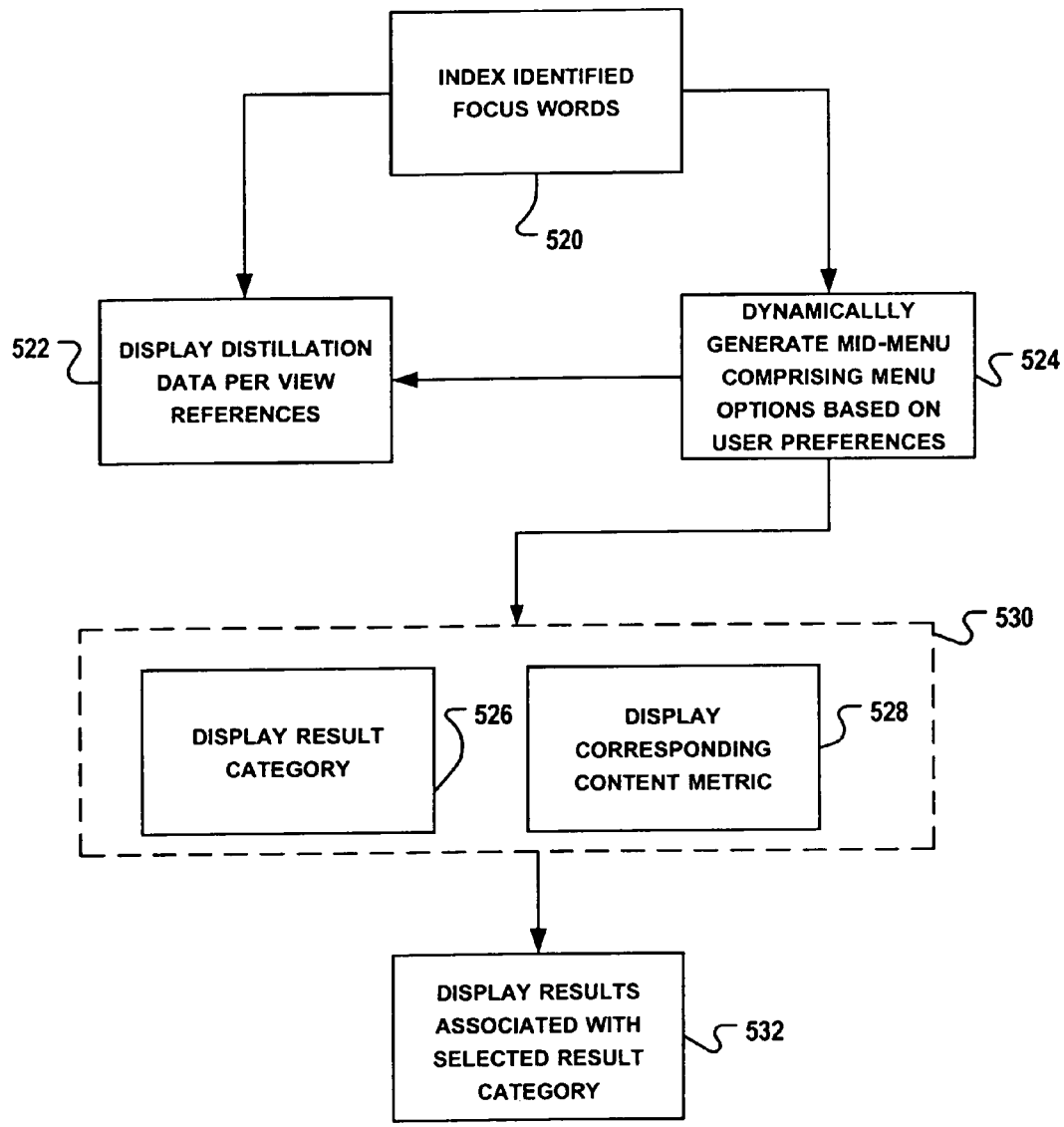
FIG. 5*b* illustrates the generation of mid-menus according to one embodiment of the invention.
Figure 5C:
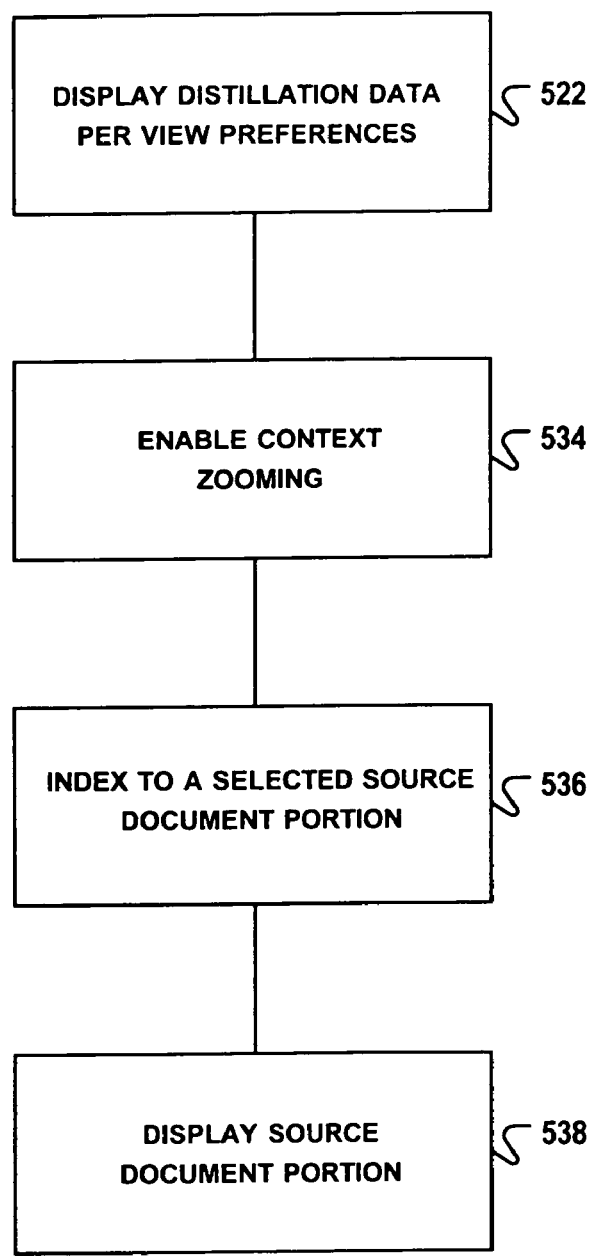
FIG. 5*c* illustrates context-zooming according to one embodiment of the invention.

A user may perform context zooming, wherein a user is presented with a data type 522 (FIG. 5*c*), and obtains a focused entry into the source document by selecting the distilled data type. The distillation process automatically enables context zooming 534 when distilled data is displayed 522. A distilled data type can be, for example a key point, an abstract, a matched-in-context key point, or focus word. In one exemplary embodiment, the distillation process automatically creates key points (or other data types) that index 536, in real-time, into a portion of the source document that surrounds the key point, and displays 538 that portion of the source document. An index may include a hyperlink to the surrounding text of the source document (where the amount of surrounding text can be set in by the user's preferences), which may be represented by an icon or text, for example, to zoom into the surrounding text. The amount of surrounding text can be determined by the user (such as through user preferences), or determined by the server in accordance with the user's device characteristics.

Context zooming gives users quick access to the full surrounding text of a key point (or selected data type) from a corresponding source document without having to hear or view the full text of the source document. Consequently, users can bypass text that may otherwise be irrelevant, or may scroll to other portions of the text from the surrounding text. For example, users of small, limited screen devices can zoom in on a portion of the source document, where the portion is appropriate for the particular device. In this manner, the user is able to view relevant portions of the source document without having to scroll through the entire document to find relevant text, and without having to be constrained by the size of the source document. Furthermore, context zooming gives a user the advantage of access to a specific portion of a document through a given distilled data type (e.g., a key point, a matched-in-context key point, a site link), without loss of context or content since the user is able to select the distilled data type for access to more detailed information.

In one example, a user is presented with three matched-in-context key points distilled from a source document: As search results are distilled 520 (FIG. 5*b*, indicating a portion of the distillation process prior to displaying distilled data), each search result can be displayed 522 (showing distilled data), and can be further processed to be automatically and dynamically grouped 524 so as to be represented by a mid-menu comprising a list of menu options. A dynamically generated mid-Menu creates a stepping stone that allows a user to analyze the distilled data in summary form. Amongst other applications, mid-menus are useful for limited screen displays, such as cellular telephones. One of the advantages of mid-menus is that they provide users with brief and quick substantive access to a source'document without having to review the full text of the source document, and without having to review all the distilled data. Substantive access provides the user with more than mere data descriptions and titles. Substantive access provides the user with information related to a given source document, where the information is processed and categorized.

Each menu option 530 on a mid-menu may comprise a result category, and a corresponding content metric. A result category represents a category of data that has been analyzed and comprises results for the particular category of data. A content metric represents a qualitative or quantitative value of the particular category to give the user substantive access to a search result, where a quantitative measure may comprise, for example, the number of appearances for a given result category, or the length of text; and a qualitative measure may comprise, for example, a relative precision rating of a data type. The type of content metric that is displayed depends upon the nature of the given result category. Content metric, whether a qualitative or a quantitative measure, can be represented as a number, an icon, or symbol.

When a result category and corresponding content metric is displayed 526, 528 to the user on the mid-menu, the user may select the menu option 530. Selecting the menu option 530 displays the results associated with the result category 532.

A result category may comprise a data type that represents a source document that is distilled in accordance with a data type constraint associated with the data type. For instance, a key point represents distilled data in accordance with a key sentence (which may be an entire sentence, a portion thereof, or combination with another or other sentences); a focus word represents distilled data in accordance with a conceptually related word; and site link represents distilled data in accordance with a URL (Uniform Resource Locator). For example:

1> Key Points (8)
2> Matched-in-Context (6)
3> Focus Words (14)
4> Site Links (4)
5> Full Text (163)
6> Personal Names (9)
7> Patent Issues (12)
8> Back to Results
9> New Search Options 1-7 are data types. For instance, "Key Points" represents key sentences, which may comprise an entire sentence, portions thereof, or combinations with other sentences, that are distilled from the given search result. The numbers in parenthesis represent the content metric, or the value of the corresponding Key Point. In the example above, the content metrics comprise a quantitative measure, namely, content density which tells a user that there are 6 "Key Points"; 6 "Matched-in-Context" key points; 14 "Focus Words"; 4 "Site Links"; and 163 words in the "Full Text" of the document. In one embodiment, "Personal Names" and "Patent Issues" represent names and terms, respectively, found in a lookup table, where a corresponding content metric represents the number of occurrences of personal names in the given source document. (In another embodiment, discussed below, "Personal Names" and "Patent Issues" can be user-defined.)

Alternatively, or conjunctively, a content metric can represent a qualitative measure, such as relevancy or precision, which can be determined by a standard computation linguistic algorithm for precision, frequency, and recall. For example, a result category can be rated for its relative precision to the user's search criteria, where each of the Key Points is rated, and the 6 Key Points are averaged to determine a precision rating for a result category.

Result categories may additionally comprise user-defined types. As illustrated by the following example, when a user defines search-related preferences, the user may also enter data for user-defined types, such as "SiteSnaps™", "Personal Names" and "Patent Issues" sections.

1> SiteSnaps™ (6)
2> Matched-in-Context (6)
3> Personal Names (9)
4> Patent Issues (12)
5> Full Text (163)
6> Back to Results
7> New Search User-defined types refer to any type of data grouping that is useful to the user, but which does not fall into the category of a data type. For example, a user can create a category called "SiteSnaps™" and define it so that it finds a full range of data types, or it finds data types listed by the user. The user can then define its corresponding content metric so that it represents the number of different data types that are returned by a given search (as opposed to how many data types are selected by the user in the user's preferences).

"Personal Names", rather than being a data type, can be defined by the user to search for a name (or names) entered by the user such that the mid-menu determines how many occurrences of the name (or names) occur within all data types selected by the user. Similarly, a "Patent Issues" category can be created to search for a term (or terms) entered by the user, where the term is (or terms are) related to patent issues, for example, and the mid-menu displays the number of occurrences of the term (or terms) in the data types selected by the user. These user-defined types are exemplary, are not exclusive, and may encompass many other types not discussed herein.

A menu option may also comprise a predefined menu option, as shown by options 8 and 9, and 6 and 7, respectively, on the sample menus above, which represent predefined menu options for navigating the menu.

Furthermore, mid-menus can be based on user preferences, where a user can determine the menu options that are displayed on the mid-menu, in one example, or a server can automatically determine the mid-menu options based on user preferences. When the mid-menu is dynamically and automatically generated, those menu options are automatically displayed.

"Maurice Young Entrepreneurship and Venture Capital Research Centre at the Faculty of Commerce, University of British Columbia."

" . . . Venture Capital Consultants. Visit our roster of venture capital consultants, including business plan, legal, and marketing . . . "

"Venture Capital Information Sources learn from our listing of venture capital information sources, including libraries . . . "

If the user scrolls to and/or selects the third matched-in-context key point ("Venture Capital Information Sources learn from our listing of venture capital information sources, including libraries . . . ") using a particular device's navigation methods (e.g., voice or keypad), the user would link to the surrounding text of the key points, for example:

"Venture Capital Information Sources learn from our listing of venture capital information sources, including libraries, magazines, and venture capital associations. Venture Capital Investors meet a wide variety of venture capital firms in a list so big that it's categorized alphabetically, by development stage, by specialty, and by country."

where the key point is displayed in italicized text in this example.

Figure 7:
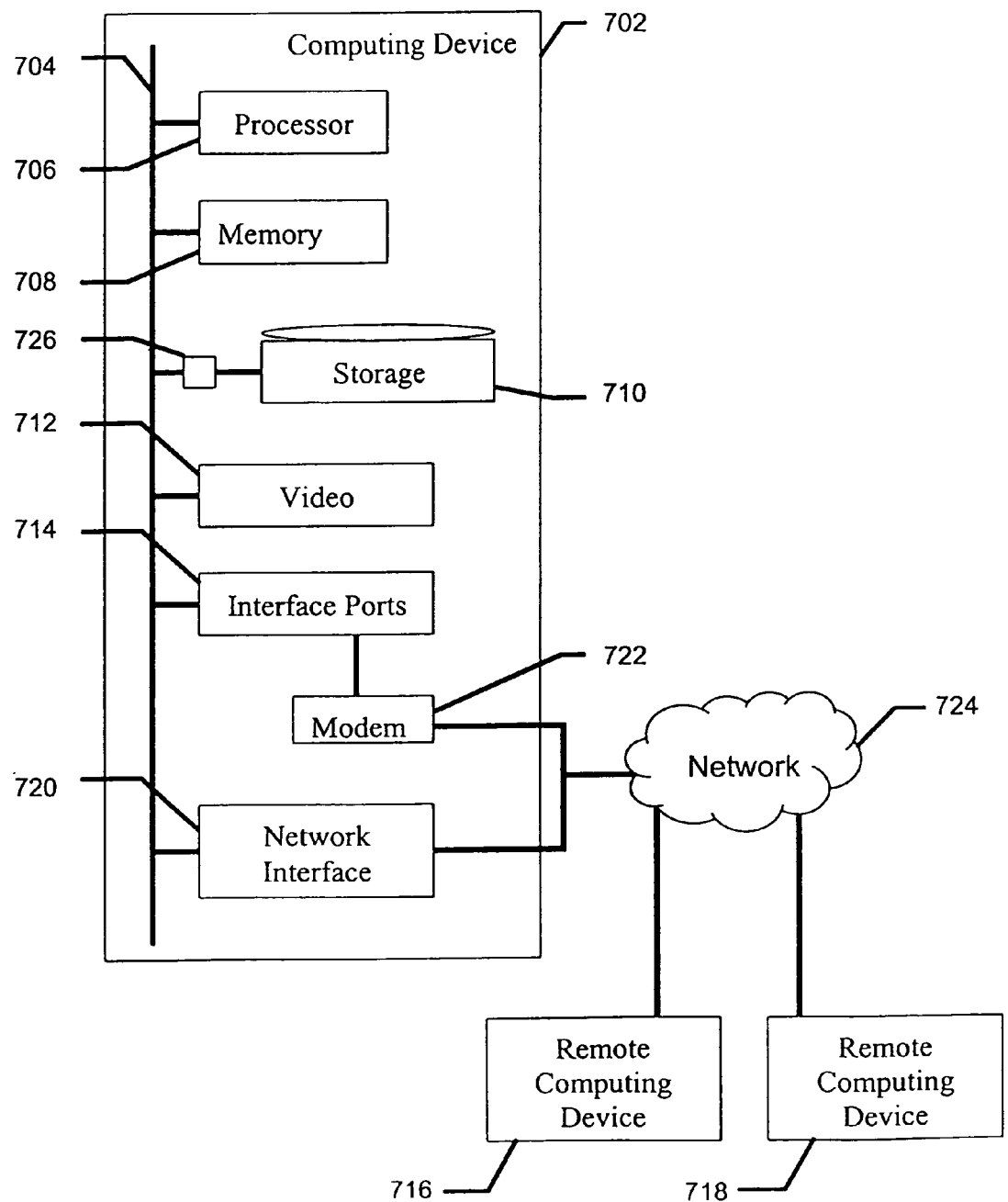
FIG. 7 illustrates a suitable computing environment in which certain aspects the illustrated invention may be practiced.

FIG. 7 and the following discussion are intended to provide a brief, general description of a suitable computing environment in which clients 100, 106, 108, search server 102, and other aspects of the illustrated invention may be implemented. Portions of the invention may be described by reference to different high-level program modules and/or low-level hardware contexts. Those skilled in the art will realize that program module references can be interchanged with low-level hardware instructions.

It will also be appreciated that most or all of the functionality discussed above for the search server 102 (FIG. 1) can be entirely incorporated into the client device 100 (FIG. 1), or processing shared (according to an appropriate handshaking protocol). In one embodiment, the handshaking protocol allows the client to negotiate with the search server for determining which tasks the client will or is willing to perform. In an alternate embodiment, the client directly accesses a data source; or monitors an ongoing data stream (e.g., a music, data, information ticker, etc.), and performs the distillation process on the monitored data.

Program modules include procedures, functions, programs, components, data structures, and the like, that perform particular tasks or implement particular abstract data types. The modules may be incorporated into single and multiprocessor computing systems, as well as hand-held devices and controllable consumer devices (e.g., mobile devices, set-top boxes, Internet appliances, etc.). It is understood that modules may be implemented on a single computing device, or processed over a distributed network environment, where modules can be located in both local and remote memory storage devices.

An exemplary system for implementing portions invention include a computing device 702 having system bus 704 for coupling various components within the computing device. The system 704 bus may be any of several types of bus structures, such as PCI, AGP, VESA, Microchannel, ISA and EISA, etc. Typically, attached to the bus 704 are processors 706 such as Intel, DEC Alpha, PowerPC, programmable gate arrays, etc., a memory 708 (e.g., RAM, ROM, PROM, EEPROM, etc.), storage devices 710, a video interface 712, and input/output interface ports 714. The storage systems and associated computer-readable media provide storage of data and executable instructions for the computing device 702. Storage options include hard-drives, floppy-disks, optical storage, magnetic cassettes, tapes, flash memory cards, memory sticks, digital video disks, and the like, and may be connected to the bus 704 by way of an interface 726.

Processors for the client 100 and search server 102 may be directed according to programming instructions encoded within nonvolatile memory (ROM, EPROM, E/EPROM, F/PGA, etc.), application specific integrated circuits (ASICs), or as part of the instructions for an operating system (e.g., the Microsoft Windows CE, Palm Computing, or other operating system may be extended to support the above-described search and distillation processes).

Computing device 702 is expected to operate in a networked environment using logical connections to one or more remote computing devices 716, 718 through a network interface 720, modem 722, or other communication pathway. Computing devices may be interconnected by way of a network 724 such as a local intranet or the Internet. Thus, with respect to the illustrated embodiments, assuming computing device 702 is a client seeking to perform a search, then remote devices 716, 718 may be a search server 716 and another searcher 718.

It will be appreciated that remote computing devices 716, 718 may be configured like computing device 702, and therefore include many or all of the elements discussed for computing device 702. It should also be appreciated that computing devices 702, 716, 718 may be embodied within a single device, or separate communicatively-coupled components, and include routers, bridges, peer devices, web servers, and application programs utilizing network application protocols such as HTTP, File Transfer Protocol (FTP), Gopher, Wide Area Information Server (WAIS), and the like.

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," and the like are used herein, these phrases are meant to generally reference embodiment possibilities, and are not intended to limit the invention to particular embodiment configurations.

As used herein, these terms may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for real-time distillation of a source document, comprising:
   receiving search criteria from a client;
   searching at least one source based on the search criteria;
   determining search results responsive to said searching;
   distilling a selected one of the search results in substantially real time relative to the time of selection, the selected search result having a first content and wherein the distillation comprises the step of extracting content from the first content in accordance with at least one data type criterion selected from a plurality of predefined data type criteria; and
   creating a distilled version of the selected search result including the extracted content, wherein the distilled version constitutes a data entity having a predefined format and that is distinct from the search result.

2. A method as in claim 1, further comprising the step of creating an index in the distilled version, wherein the index allows selective entry into the content of the corresponding search result.

3. A method for displaying search results, comprising:
   receiving search criteria from a client;
   searching at least one source based on the search criteria;
   determining search results responsive to said searching, the search results comprising source documents;
   selecting one of the source documents, the selected document having a first content;

at substantially the time of selection, distilling the selected source document into a result object having a predefined format and that is created as a distinct data entity from the selected source document, wherein the result object includes a second content and the second content is derived from the first content in accordance with at least one predefined distillation criterion; and creating an index from the result object into the selected source document, wherein selection of the index provides a display of a corresponding portion of the first content.

4. A method for displaying search results, comprising:
receiving search criteria from a client;
searching at least one source based on the search criteria;
determining a plurality of search results responsive to said searching;
distilling a selected one of the search results into a result object, wherein the result object is created as a separate data entity from the selected search result, and comprises content extracted from the selected search result;
creating a mid-menu that corresponds to the result object, the mid-menu comprising a plurality of menu options, each menu option including
at least one result category; and
a content metric, the content metric being a measure of a relative value of the result category; and
displaying the mid-menu.

5. A method as in claim 4, wherein the content metric comprises a quantitative measure of the relative value of the result category.

6. A method as in claim 5, wherein the quantitative measure comprises a number of results for the result category.

7. A method as in claim 5, wherein the quantitative measure comprises a number of occurrences of pre-specified data.

8. A method as in claim 4, wherein the content metric comprises a qualitative measure of the relative value of the result category.

9. A method as in claim 8, wherein the qualitative measure comprises an indicator of the relevance of the results of the result category to the search criteria.

10. A method as in claim 4, wherein at least one result category comprises a data type.

11. A method as in claim 4, wherein at least one result category comprises a user-defined type.

12. A method as in claim 4, additionally comprising determining user preferences, and dynamically creating the mid-menu in accordance with the user preferences.

13. A method for displaying search results, comprising:
receiving search criteria from a client;
searching a plurality of sources based on the search criteria;
determining search results responsive to said searching;
distilling a selected one of the search results into a result object, wherein the result object is created as a separate data entity from the selected search result, and comprises content extracted from the selected search result;
determining user preferences;
creating a mid-menu in accordance with the user preferences, the mid-menu corresponding to the result object and comprising a plurality of menu options, each menu option including
a result category, each result category having a number of results; and
a content metric for each result category, the content metric being a measure of the value of the result category; and
displaying the mid-menu.

14. A method as in claim 13, wherein the content metric comprises a quantitative measure for each result category.

15. A method as in claim 13, wherein the content metric comprises a qualitative measure for each result category.

16. A method for searching, comprising:
receiving search criteria;
searching at least one body of knowledge based on the search criteria;
providing a plurality of search results that are responsive to the searching;
displaying on a display device a list of at least some of the search results, the list comprising:
a separate and unique identifier corresponding to each one of the search results in the list; and
a separate distillation trigger associated with each unique identifier; and
wherein selection by a user of a distillation trigger causes a substantial real-time creation of a distilled version of the search result corresponding to the unique identifier associated with the selected distillation trigger, and wherein the distilled version is created as a data entity distinct from the corresponding search result and includes content extracted from the search result.

17. A method as defined in claim 16, wherein the unique identifier is a URL corresponding to the search result in the list.

18. A method as defined in claim 16, wherein the unique identifier is a title corresponding to the search result in the list.

19. A method as defined in claim 16, wherein the unique identifier is an abstract corresponding to the search result in the list.

20. A method as defined in claim 16, wherein selection by a user of the unique identifier causes a full content version of the corresponding search result to be displayed on the display device.

21. A method as defined in claim 16, wherein the distilled version includes content extracted from the corresponding search result in accordance with at least one predefined data type.

22. A method as defined in claim 21, wherein the at least one predefined data type is selected from one of the following data types: a key point; a focus word; a matched-in-context key point; a title; and a URL.

23. A method as defined in claim 21, wherein the at least one data type provides an index to content of the corresponding search result.

24. A method as defined in claim 21, further comprising the steps of:
displaying the distilled version on the display device; and
wherein selection by a user of a predefined data type within the displayed distilled version causes a substantially real time entry into the content of the corresponding search result.

25. A method as defined in claim 24, further comprising the step of displaying a predefined portion of the content of the search result, wherein the predefined portion is adjacent to the data type selected by the user within the distilled version.

26. A method as defined in claim 16, further comprising the step of displaying the distilled version on the display device.

27. A method as defined in claim 16, wherein at least some of the search results are comprised of textual documents.

28. A method for searching, comprising:
receiving search criteria;
searching at least one body of knowledge based on the search criteria;
providing a plurality of search results that are responsive to the searching;

distilling a selected one of the search results into a result object that is created as a data entity having a predefined format and that is distinct from the search result, the result object including content extracted from the selected search result in accordance with a plurality of data type preferences selected from a plurality of predefined data type preference types;

creating a menu corresponding to the result object, the menu including a plurality of menu options, wherein each menu option defines a result category that is descriptive of a predefined portion of the content of the result object; and graphically displaying the menu on a display device, wherein a user may optionally select any one of the menu options.

29. A method as defined in claim 28, wherein at least one result category comprises one of the selected data type preference types used to distil the search result.

30. A method as defined in claim 28, wherein selection of a menu option causes a corresponding content portion of the result object to be displayed on the display device.

31. A method as defined in claim 28, wherein selection of a menu option causes a corresponding content portion of the selected search result to be displayed on the display device.

32. A method as defined in claim 28, further comprising a plurality of content metrics that are associated with a corresponding menu option, wherein each content metric is representative of a value for the result category of the menu option.

33. A method as defined in claim 32, wherein the value represented by the content metric is a quantitative measure of the corresponding result category.

34. A method as defined in claim 33, wherein the quantitative measure comprises a number of results for the corresponding result category.

35. A method as defined in claim 33, wherein the quantitative measure comprises a number of occurrences of a data type specified by the corresponding result category.

36. A method as defined in claim 32, wherein the value represented by the content metric is a qualitative measure of the corresponding result category.

37. A method as defined in claim 36, wherein the qualitative measure is indicative of the degree of relevance of the corresponding result category to the search criteria.

* * * * *

UNITED STATES PATENT AND TRADEMARK OFFICE
CERTIFICATE OF CORRECTION

| | | |
|---|---|---|
| PATENT NO. | : 7,844,594 B1 | Page 1 of 1 |
| APPLICATION NO. | : 09/649436 | |
| DATED | : November 30, 2010 | |
| INVENTOR(S) | : Thomas D. Holt et al. | |

It is certified that error appears in the above-identified patent and that said Letters Patent is hereby corrected as shown below:

Title Page

(63), please delete "Continuation-in-part of application No. 09/336,020, filed Jun. 18, 1999, now abandoned." and substitute -- Continuation-in-part of application No. 09/336,020, filed Jun. 18, 1999, now abandoned, and Continuation-in-part of application No. 09/565,674, filed May 4, 2000, now abandoned. --.

Signed and Sealed this
Twenty-second Day of November, 2011

David J. Kappos
*Director of the United States Patent and Trademark Office*